United States Patent
Wu

(10) Patent No.: US 8,523,418 B2
(45) Date of Patent: Sep. 3, 2013

(54) LED LIGHT BAR AND BACKLIGHT MODULE OF LIQUID CRYSTAL DISPLAY DEVICE

(75) Inventor: Zexin Wu, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 27 days.

(21) Appl. No.: 13/381,941

(22) PCT Filed: Dec. 7, 2011

(86) PCT No.: PCT/CN2011/083650
§ 371 (c)(1),
(2), (4) Date: Dec. 31, 2011

(87) PCT Pub. No.: WO2013/078728
PCT Pub. Date: Jun. 6, 2013

(65) Prior Publication Data
US 2013/0141940 A1 Jun. 6, 2013

(30) Foreign Application Priority Data
Dec. 1, 2011 (CN) .......................... 2011 1 0393222

(51) Int. Cl.
*F21S 4/00* (2006.01)

(52) U.S. Cl.
USPC ...................................... 362/612; 362/249.02

(58) Field of Classification Search
USPC ............... 362/249.02, 249.01, 294, 600, 608, 362/615, 610–613, 632–634, 561; 349/58
See application file for complete search history.

(56) References Cited

U.S. PATENT DOCUMENTS
2005/0023538 A1* 2/2005 Ishii et al. ........................ 257/79
2009/0268434 A1* 10/2009 Mita et al. ..................... 362/97.1

* cited by examiner

*Primary Examiner* — Anne Hines
(74) *Attorney, Agent, or Firm* — Cheng-Ju Chiang

(57) ABSTRACT

The present invention provides an LED light bar and a backlight module of liquid crystal display device. The LED light bar of liquid crystal display device includes: a metal core printed circuit board and an LED chip mounted on the metal core printed circuit board. The metal core printed circuit board includes a metal substrate, an insulation layer formed on the metal substrate, and a circuit formed on the insulation layer. The LED chip has leads to electrically connect with the circuit. The insulation layer forms a hollow portion corresponding to the LED chip. The LED chip is received in the hollow portion and the LED chip has an undersurface engaging the metal substrate. The present invention has a simple structure, is easy to manufacture, and makes an LED light bar showing improved heat dissipation performance.

10 Claims, 2 Drawing Sheets

LED LIGHT BAR AND BACKLIGHT MODULE OF LIQUID CRYSTAL DISPLAY DEVICE

BACKGROUND OF THE INVENTION

1. Field of the Invention

The present invention relates to the technical field of TFT-LCD (Thin Film Transistor-Liquid Crystal Display) liquid crystal displaying, and in particular to an LED (Light Emitting Diode) light bar and a backlight module of liquid crystal display device.

2. The Related Arts

A liquid crystal display is commonly abbreviated as LCD, and the operation principle is placing liquid crystal molecules between two parallel pieces of glass. A plurality of tiny vertical and horizontal conductive wires is arranged between the pieces of glass and change of direction of the liquid crystal molecules is controlled through application of electricity so as to refract light out to form an image. The liquid crystal display is now widely used due to various advantages of being compact in size, saving of power, and being free of radiations. Most of the liquid crystal display devices that are currently available in the market are backlighting liquid crystal display devices, which generally comprise a liquid crystal panel and a backlight module. The backlight module is generally divided into two categories, including edge backlight module and direct backlight module, for supplying back light to a liquid crystal display screen. The direct backlight module arranges a light source, such as CCFL (Cold Cathode Fluorescent Lamp) or LED (Light-Emitting Diode), on a back side of the liquid crystal panel, which have the disadvantages of arrangement and wire layout being complicated, requiring more light sources, and high cost. The edge backlight module arranges a LED light bar at a side edge of a back panel to cooperate with a light guide plate in such a way that light emitting from the LED light bar enters the light guide plate from a light incidence surface of the light guide plate and, after being reflected and diffused, is allowed to project out from a light exit surface of the light guide plate to form a planar light source that is supplied to the liquid crystal panel. Due to the advantages of low cost, low power consumption, and being environmental friendly, the edge backlight module has wide applications.

For both the direct and edge backlight modules, when put into operation, the LED light bar gives off heat and the heat affects the performance of the liquid crystal display device for example causing expansion of the light guide plate and thus affecting light homogeneity and shortening the lifespan of the LED light bar. Consequently, the way of dissipating heat plays an important role for a liquid crystal display device. The most direct way is to dissipate heat through the LED light bar. The LED light bar generally comprises a PCB and LED chips mounted on the PCB. Since an ordinary PCB (Printed Circuit Board) is made of FR4 material, which has a low thermal conductivity, generally around 0.3 W/m-k, a metal core PCB (MCPCB) is commonly used to replace a PCB of FR4 material in order to increase thermal conduction performance. The MCPCB shows a thermal conductivity of around 3 W/m-k. However, a MCPCB is formed by bonding a circuit board body and a metal substrate and the LED light bar is mounted to the circuit board body, so that the thermal conductivity of the metal substrate is limited by the circuit board body in the middle, making the thermal conduction performance greatly reduced.

SUMMARY OF THE INVENTION

An objective of the present invention is to provide an LED light bar for liquid crystal display device, which has a simple structure, excellent performance of heat transfer, and a low cost.

Another objective of the present invention is to provide a backlight module for liquid crystal display device, which has a simple structure, excellent performance of heat transfer, and a low cost.

To achieve the above objectives, the present invention provides an LED light bar of liquid crystal display device, which comprises: a metal core printed circuit board and an LED chip mounted on the metal core printed circuit board. The metal core printed circuit board comprises a metal substrate, an insulation layer formed on the metal substrate, and a circuit formed on the insulation layer. The LED chip has leads to electrically connect with the circuit. The insulation layer forms a hollow portion corresponding to the LED chip. The LED chip is received in the hollow portion and the LED chip has an undersurface engaging the metal substrate.

The hollow portion is formed in a side edge of a circuit board body and has a U-shape.

The hollow portion has a circular shape.

The metal substrate is made of an aluminum material.

The present invention also provides a backlight module of liquid crystal display device, which comprises: a back panel, a light guide plate, and an LED light bar. The light guide plate is mounted on the back panel. The LED light bar is mounted on the back panel beside the light guide plate. The LED light bar comprises a metal core printed circuit board and an LED chip mounted on the metal core printed circuit board. The metal core printed circuit board comprises a metal substrate, an insulation layer formed on the metal substrate, and a circuit formed on the insulation layer. The LED chip has leads to electrically connect with the circuit. The insulation layer forms a hollow portion corresponding to the LED chip. The LED chip is received in the hollow portion and the LED chip has an undersurface engaging the metal substrate.

The hollow portion is formed in a side edge of a circuit board body and has a U-shape.

The metal substrate is made of an aluminum material.

The present invention also provides a backlight module of liquid crystal display device, which comprises: a back panel, a diffuser plate, and an LED light bar. The LED light bar is mounted on the back panel and located below the diffuser plate. The LED light bar comprises a metal core printed circuit board and an LED chip mounted on the metal core printed circuit board. The metal core printed circuit board comprises a metal substrate, an insulation layer formed on the metal substrate, and a circuit formed on the insulation layer. The LED chip has leads to electrically connect with the circuit. The insulation layer forms a hollow portion corresponding to the LED chip. The LED chip is received in the hollow portion and the LED chip has an undersurface engaging the metal substrate.

The hollow portion is formed in a side edge of a circuit board body and has a U-shape.

The metal substrate is made of an aluminum material.

The efficacy of the present invention is that the present invention provides an LED light bar of liquid crystal display device, which forms a hollow portion in an insulation layer formed on a metal core PCB to allow an undersurface of an LED chip to be received in and in engagement with the metal substrate in order to take advantage of the high thermal conductivity of the metal substrate of the metal core PCB for greatly increasing the heat dissipation performance of the LED light bar. A backlight module of liquid crystal display device according to the present invention uses the above described LED light bar as a light source in order to improve the overall heat dissipation performance of the whole backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description will be given to a preferred embodiment of the present invention and the drawings thereof.

Figure 1:
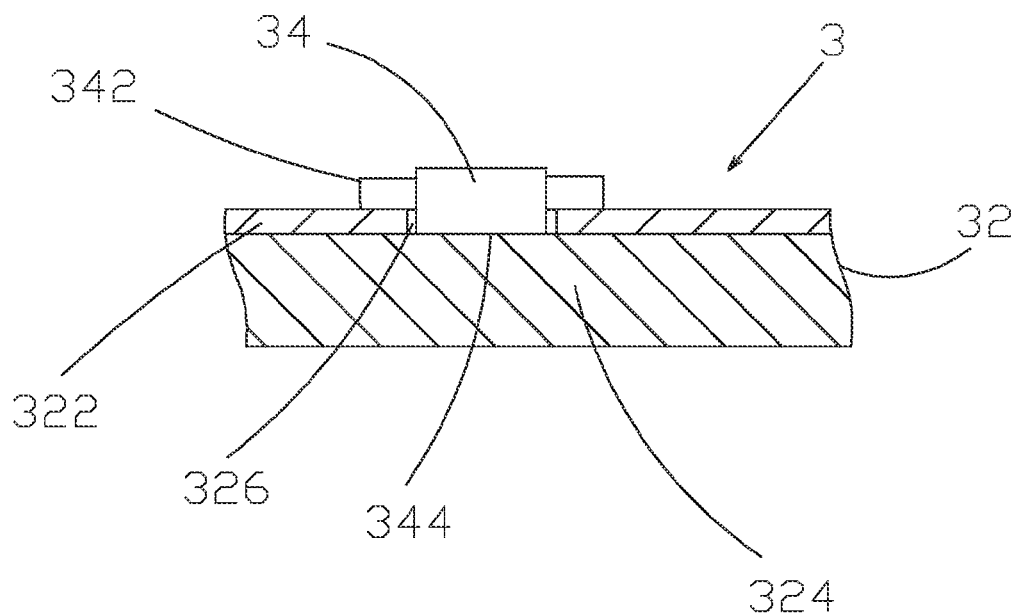
FIG. 1 is a cross-sectional view showing a portion of the structure of an LED light bar for liquid crystal display device according to the present invention.

As shown in FIG. 1, the present invention provides an LED light bar 3 for a liquid crystal display device. The LED light bar 3 comprises: a metal core PCB 32 and an LED chip 34 mounted on the metal core PCB 32. The metal core PCB 32 comprises a metal substrate 324, an insulation layer 322 formed on the metal substrate 324, and a circuit (not shown) formed on the insulation layer. The LED chip 34 uses leads to electrically connect with the circuit. The insulation layer 322 forms a hollow portion 326 corresponding to the LED chip 34. The LED chip 34 has an undersurface 344 received in the hollow portion 326 and engages the metal substrate 324.

Figure 2:
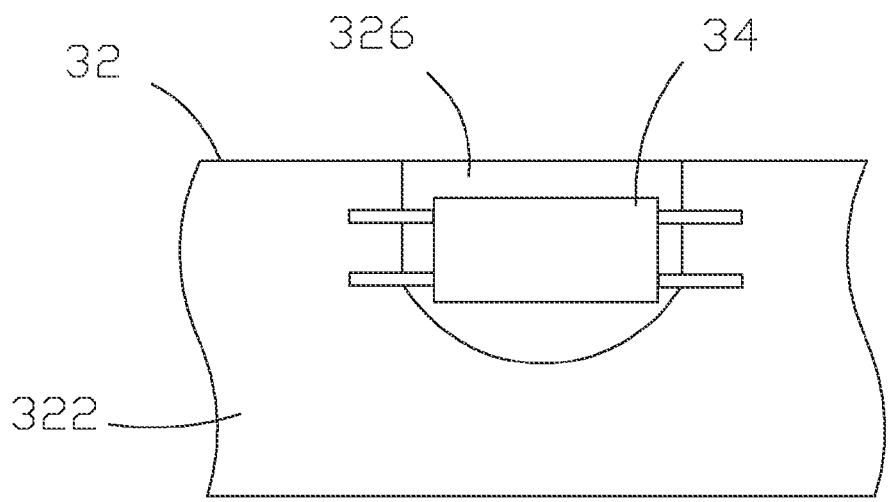
FIG. 2 is a top plan view of an embodiment of the LED light bar shown in FIG. 1.

Optionally, the hollow portion 326 is formed in an interior portion of the insulation layer 322 and has a circular shape. In case that the metal core PCB 32 is narrow, the hollow portion 326 can alternatively be formed in a side edge of the insulation layer 322 (as shown in FIG. 2). The hollow portion 326 is of a U-shaped. The shape of the hollow portion and the position thereof on the insulation layer are not constraint conditions of the present invention.

The embodiment of the present invention allows the undersurface 344 of the LED chip 34 of the LED light bar 3 to directly engage the metal substrate 324 in order to take advantage of the high thermal conductivity of the metal substrate 324 of the metal core PCB 32 for greatly increasing the heat dissipation performance of the LED light bar 3. The metal substrate 324 is preferably made of an aluminum material so that besides showing excellent heat dissipation performance, the LED light bar 3 effectively lowers down the cost.

Figure 3:
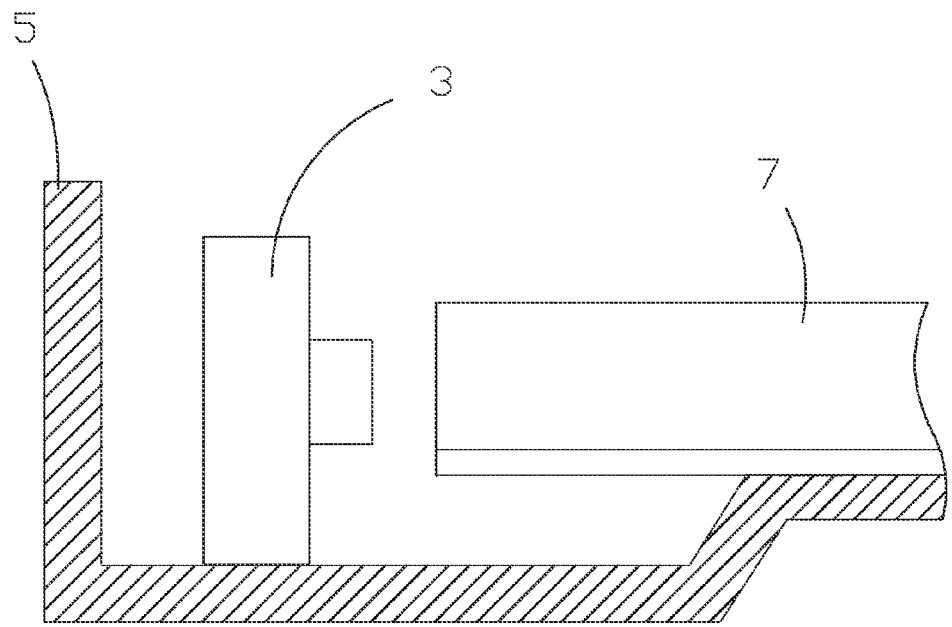
FIG. 3 is a cross-sectional view showing a portion of an embodiment of a backlight module for liquid crystal display device according to the present invention.

As shown in FIG. 3, an embodiment of backlight module of liquid crystal display device that uses the LED light bar for liquid crystal display device according to the present invention is shown. The backlight module comprises: a back panel 5, a light guide plate 7, and an LED light bar 3. The light guide plate 7 is mounted on the back panel 5, and the LED light bar 3 is mounted on the back panel 5 beside the light guide plate 7 so that the light emitting from the LED light bar 3 enters the light guide plate 7 from an end of the light guide plate 7 and, after being reflected and diffused, is projected out from a light exit surface of the light guide plate to form a planar light source to be supplied to a liquid crystal panel.

In the embodiment of the present invention, the undersurface 344 of the LED chip 34 of the LED light bar 3 is set to directly engage the metal substrate 324 (see FIG. 1) in order to take advantage of the high thermal conductivity of the metal substrate 324 of the metal core PCB for greatly increasing the heat dissipation performance of the LED light bar 3 and thereby improving the overall heat dissipation performance of the whole backlight module.

Figure 4:
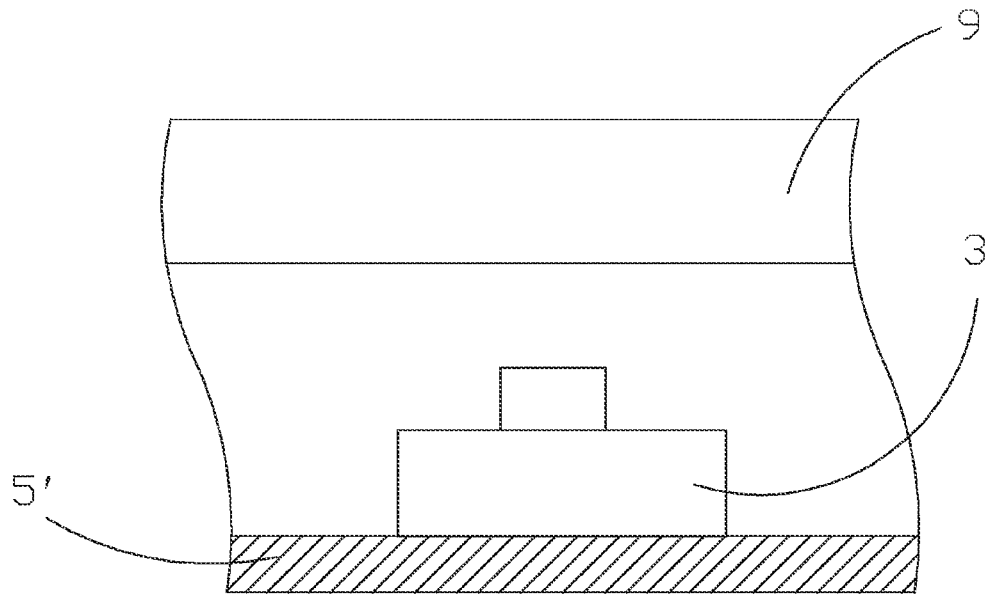
FIG. 4 is a cross-sectional view showing a portion of another embodiment of a backlight module for liquid crystal display device according to the present invention.

As shown in FIG. 4, another embodiment of backlight module of liquid crystal display device that uses the LED light bar of liquid crystal display device according to the present invention described above is shown. The backlight module of liquid crystal display device comprises: a back panel 5', a diffuser plate 9, and an LED light bar 3. The LED light bar 3 is mounted on the back panel 5' and is located below the diffuser plate 9. The light emitting from the LED light bar 3 directly transmits through the diffuser plate 9 to be supplied to a liquid crystal panel. The embodiment of the present invention takes advantage of the high thermal conductivity of the metal substrate of the metal core PCB to greatly increase the heat dissipation performance of the LED light bar and thereby improve the overall heat dissipation performance of the whole backlight module.

In summary, the present invention provides an LED light bar of liquid crystal display device, which forms a hollow portion in an insulation layer formed on a metal core PCB to allow an undersurface of an LED chip to be received in and in engagement with the metal substrate in order to take advantage of the high thermal conductivity of the metal substrate of the metal core PCB for greatly increasing the heat dissipation performance of the LED light bar. A backlight module of liquid crystal display device according to the present invention uses the above described LED light bar as a back light source in order to take advantage of the high thermal conductivity of the metal substrate of the metal core PCB for greatly increasing the heat dissipation performance of the LED light bar and thereby improving the overall heat dissipation performance of the whole backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An LED (Light Emitting Diode) light bar of a liquid crystal display device, comprising: a metal core printed circuit board and an LED chip mounted on the metal core printed circuit board, the metal core printed circuit board comprising a metal substrate, an insulation layer integrally formed on an upper surface of the metal substrate, and a circuit formed on an upper surface of the insulation layer, the LED chip having leads extending above the upper surface of the insulation layer to electrically connect with the circuit, the insulation layer forming a hollow portion corresponding to the LED chip, the LED chip being received in the hollow portion and the LED chip having an undersurface that is set, in entirety, in surface contact with the upper surface of the metal substrate.

2. The LED light bar of a liquid crystal display device as claimed in claim 1, wherein the hollow portion is formed in a side edge of a circuit board body and has a U-shape.

3. The LED light bar of a liquid crystal display device as claimed in claim 1, wherein the hollow portion has a circular shape.

4. The LED light bar of a liquid crystal display device as claimed in claim 1, wherein the metal substrate is made of an aluminum material.

5. A backlight module of a liquid crystal display device, comprising a back panel, a light guide plate, and an LED (Light Emitting Diode) light bar, the light guide plate being mounted on the back panel, the LED light bar being mounted on the back panel beside the light guide plate, the LED light bar comprising a metal core printed circuit board and an LED chip mounted on the metal core printed circuit board, the metal core printed circuit board comprising a metal substrate, an insulation layer integrally formed on an upper surface of the metal substrate, and a circuit formed on an upper surface of the insulation layer, the LED chip having leads extending above the upper surface of the insulation layer to electrically connect with the circuit, the insulation layer forming a hollow portion corresponding to the LED chip, the LED chip being received in the hollow portion and the LED chip having an undersurface that is set, in entirety, in surface contact with the upper surface of the metal substrate.

6. The backlight module of a liquid crystal display device as claimed in claim 5, wherein the hollow portion is formed in a side edge of a circuit board body and has a U-shape.

7. The backlight module of a liquid crystal display device as claimed in claim 5, wherein the metal substrate is made of an aluminum material.

8. A backlight module of a liquid crystal display device, comprising a back panel, a diffuser plate, and an LED (Light Emitting Diode) light bar, the LED light bar being mounted on the back panel and located below the diffuser plate, the LED light bar comprising a metal core printed circuit board and an LED chip mounted on the metal core printed circuit board, the metal core printed circuit board comprising a metal substrate, an insulation layer integrally formed on an upper surface of the metal substrate, and a circuit formed on an upper surface of the insulation layer, the LED chip having leads extending above the upper surface of the insulation layer to electrically connect with the circuit, the insulation layer forming a hollow portion corresponding to the LED chip, the LED chip being received in the hollow portion and the LED chip having an undersurface that is set, in entirety, in surface contact with the upper surface of the metal substrate.

9. The backlight module of a liquid crystal display device as claimed in claim 8, wherein the hollow portion is formed in a side edge of a circuit board body and has a U-shape.

10. The backlight module of a liquid crystal display device as claimed in claim 8, wherein the metal substrate is made of an aluminum material.

* * * * *